INVENTOR.
MARTIN FRISCH
BY C. R. Miranda
ATTORNEY

INVENTOR.
MARTIN FRISCH
BY
C. R. Miranda
ATTORNEY

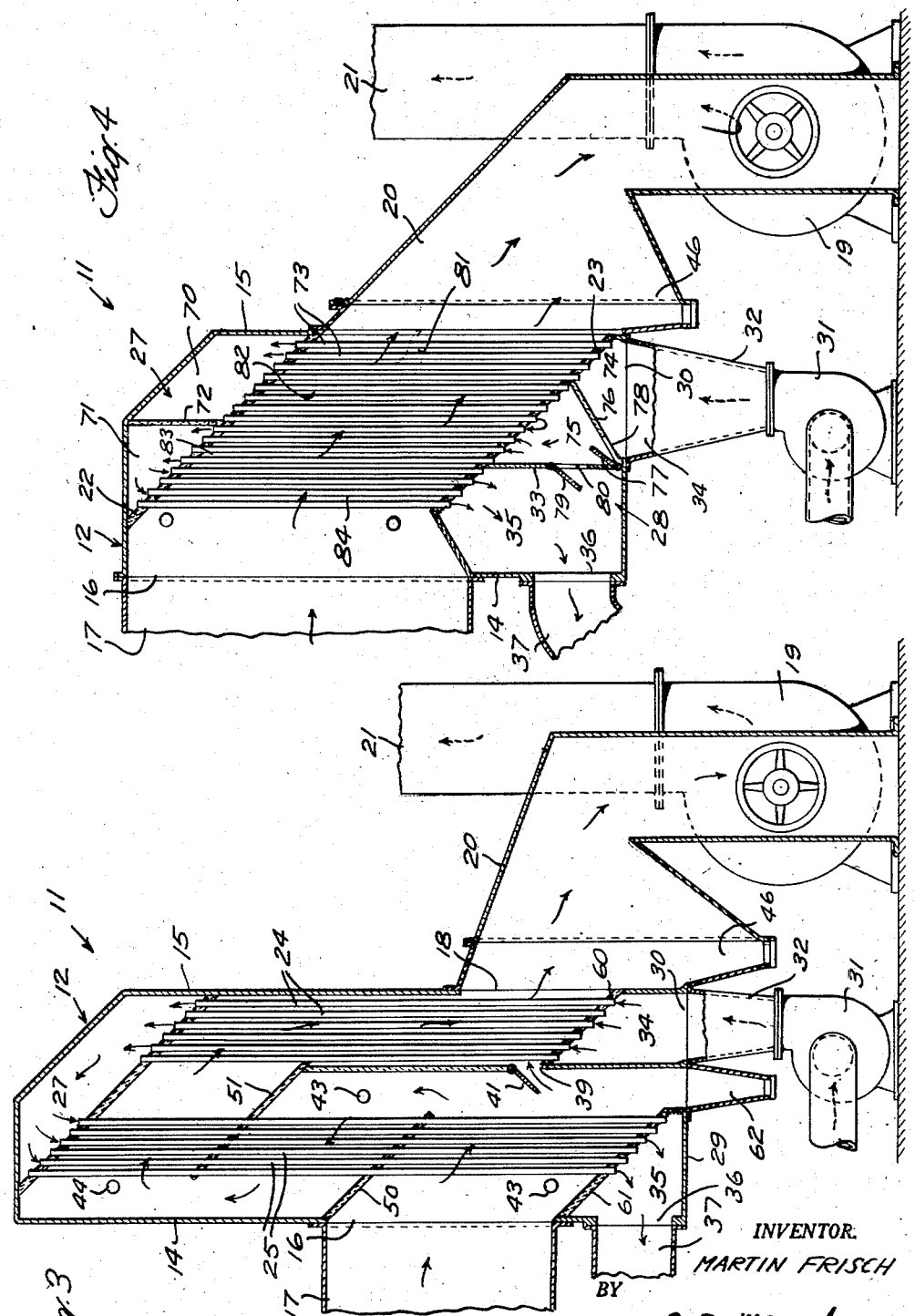

United States Patent Office 2,801,830
Patented Aug. 6, 1957

2,801,830
HEAT EXCHANGE APPARATUS

Martin Frisch, New York, N. Y., assignor to Foster Wheeler Corporation, New York, N. Y., a corporation of New York Application October 8, 1953, Serial No. 384,945

16 Claims. (Cl. 257—222)

This invention relates to heat exchange apparatus and more particularly pertains to apparatus for heating one fluid by passing it in heat exchange relationship with another fluid.

The present invention is particularly adapted for, though not necessarily limited to, use with vapor generators wherein means are employed to preheat relatively cool air by passing combustion gases in indirect heat exchange relationship with the air.

In the conventional air heater for a vapor generator when the gas temperature in at least a portion of the heater approaches the dew point temperature because the heat exchange surfaces are necessarily cooler, the moisture carried in the gas is caused to condense on the surface thereby causing corrosion of the air heater. Furthermore, in tubular air heaters wherein heating gases flow on the outside of tubes and air to be heated flows through the tubes, the gases carry foreign matter, as for example soot, dirt, etc. which deposit on the tubes and accordingly decrease the efficiency of operation of the air heater.

The present invention contemplates a heat exchanger wehrein novel means are provided for controlling the temperature of the heated gas to prevent the latter from reaching a dew point temperature and means are provided for efficiently removing foreign matter from the heater.

The present invention provides a tubular heat exchanger wherein a heating gas passes countercurrent and in heat exchange relationship with a fluid to be heated, as for example, air. The heating gas and the fluid to be heated normally follow predetermined paths of flow but when the temperature of the gas approaches or falls below the dew point value, means are provided for "short-circuiting" a portion of gas or fluid, or both, to cause the gas and/or fluid to pass in less than its entire path of flow so as to raise the temperature of the gas above the dew point value. The heat exchanger comprises a gas inlet and a gas outlet defining the first and last points respectively, of the path of flow of the heating gas through the heat exchanger, and bypass damper means provide for short-circuiting of the gas by passing a portion of the gas from the inlet directly to the outlet so that the portion of gas does not traverse the entire path of flow. Tube sheets mount and support opposite ends of a plurality of vertically arranged tubes through which the fluid to be heated flows and the tube sheets are inclined to provide gravity discharge of foreign matter from the heat exchanger. The present invention provides an extremely compact arrangement having air inlet and outlet connections adjacent so that forced draft and induced draft fans may be located at the same operating level and connected to the heat exchanger with a minimum of ducts and flues.

The invention will be understood from a consideration of the detailed description which follows taken together with the accompanying drawings wherein several embodiments of the invention are illustrated.

In the drawings wherein like reference characters refer to the like parts throughout the several views:

Fig. 3 is a sectional view of a third embodiment of the present invention and is similar to the first embodiment; and Fig. 4 is a sectional view of a fourth embodiment of the present invention, and provides for the bypassing of fluid to be heated.

Figure 1:
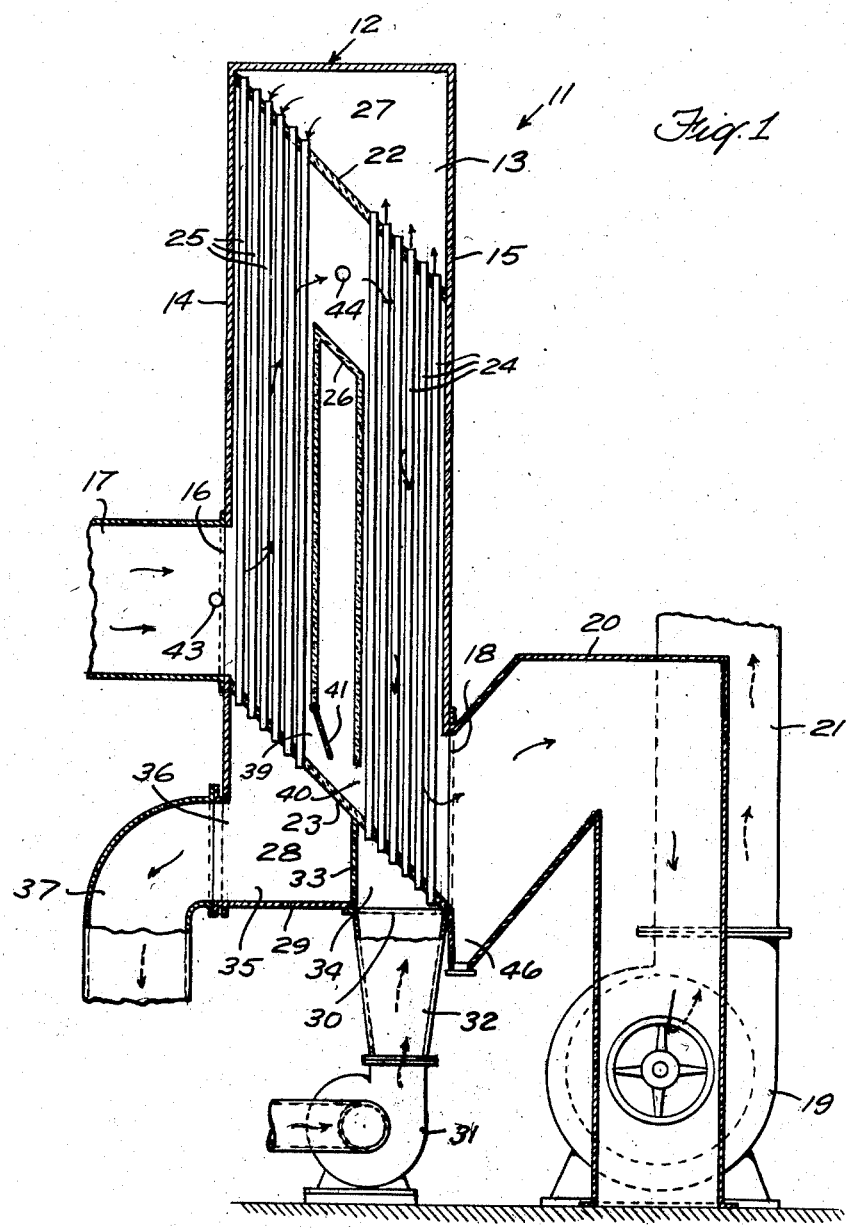
Fig. 1 is a vertical sectional view of the heat exchanger of the present invention.

Referring now to the drawings for a more detailed description of the present invention and more particularly to Fig. 1 wherein one embodiment thereof is clearly illustrated, a vertical heat exchanger or air heater, generally designated by the numeral 11, comprises a casing 12 having a chamber 13 and a pair of parallel side walls 14 and 15 defining part of the chamber. Wall 14 has an opening or heating gas inlet 16 formed therein which communicates with a vapor generator (not shown) by way of a combustion gas conduit 17, while wall 15 has an opening or gas outlet 18 formed therein which provides for discharge of heating gas from the chamber 13. An induced draft fan 19 communicates with gas outlet 18 by way of a gas duct 20 and serves to draw the heating gas through the air heater. Fan 19 causes the heating gas to flow through gas duct 20 and to discharge to a stack 21 in communication with the fan outlet.

An upper tube sheet 22 and a lower tube sheet 23 are disposed in chamber 13 and are secured to the walls of casing 12, the tube plates being inclined for a purpose to be brought out presently. Tube sheets 22 and and 23 mount and support the opposite ends of a pair of vertically arranged tube banks 24 and 25 which are spaced to accommodate a substantially U-shaped baffle 26. Tube sheets 22 and 23 together with the adjacent walls of casing 12 define fluid chambers 27 and 28, respectively, which are in fluid-tight relationship with heating gas flowing through chamber 13. Baffle 26 is arranged in the chamber to provide a two pass path of flow for the heating gas. The bottom or floor 29 of casing 12 forms a wall of fluid chamber 28 and has an opening or inlet 30 formed therein communicating with a force draft fan 31 by way of a conduit 32. Fan 31 draws in a fluid to be heated, as for example air, which is to be used for combustion in a furnace (not shown) and forces the air through inlet 30. A baffle or partition 33 is arranged in fluid chamber 28 and defines an inlet chamber 34 and an outlet chamber 35 in fluid-tight relationship. An opening or outlet 36 is formed in a wall of outlet chamber 35 and communicates with the furnace (not shown) by way of an outlet duct 37. The combustion air entering inlet chamber 34 passes through the tubes of tube bank 24, thence in fluid chamber 27, then through the tubes of tube bank 25 from which the air flows into outlet chamber 35 and discharges through outlet 36.

Arranged in the side walls of baffle 26 and adjacent lower tube sheet 23 are a pair of openings 39 and 40 which communicate with each other and with the gas inlet 16 and gas outlet 18 to provide a "short-circuited" path for the heating gas, whereby a portion of the heating gas can flow directly from inlet 16 to outlet 18 without traversing the entire path of flow. A movable door or damper 41 is pivotally mounted on the left side wall of the baffle 26 and is arranged to completely shut off passage of gas through opening 39 if desired, or in other positions thereof, to regulate the amount of gas therethrough.

A soot blower 43, as for example a pipe with openings for passage of high velocity jets of steam, is disposed in gas inlet 16 and adjacent lower tube sheet 23 while another soot blower 44 is arranged adjacent the top of the baffle 26. It is generally known that combustion gases from a furnace carry foreign matter such as soot, dirt etc., which gas when passing over the tube sheets and tubes causes deposit of the foreign matter on the chamber walls, sheets and tubes. Part of the foreign matter falls to the lower tube sheets and remains there. With the present invention, however, the tube sheets are inclined so that gravity aids in causing the foreign matter to flow toward the side wall 15 of casing 12. Soot blowers 43 and 44 are used to dislodge the foreign matter which remains on the surfaces of the heat exchanger, and, also aids in moving the foreign particles along the lower tube sheet. When the heat exchanger is to be cleaned, damper 41 is moved to uncover opening 39 to thereby provide passage of foreign matter from the portion of the tube sheet on the left side of the baffle 26 to a portion of the tube sheet on the other side of the baffle. The foreign matter discharges through gas outlet 18 and then is deposited in a collector hopper 46 formed in gas duct 20 and immediately adjacent the gas outlet.

In operation, heating gas from a combustion chamber (not shown) passes through conduit 17 and gas inlet 16 into chamber 12. The gas makes one pass upwardly in the chamber flowing around the tubes, passes over the top of baffle 26, thence downwardly in the chamber and through gas outlet 18. The fluid to be heated, or combustion air, is forced by fan 31 into inlet chamber 34 from whence the air flows through the tubes of tube bank 24, into fluid chamber 27, through the tubes of tube bank 25, into outlet chamber 35, and discharges through outlet 36 into a combustion chamber (not shown). The air in passing in indirect heat exchange relationship with the heating gas absorbs some of the heat from the latter so as to enter the combustion chamber at a higher temperature than that at which it entered the heat exchanger. Since the heating gas loses heat progressively in its travel through its path of flow, the temperature of the gas at the outlet 18 may approach or be below the dew point temperature so as to cause condensation of moisture therein and subsequent corrosion of the tubes. To obviate this unfavorable condition, bypass damper 41 is displaced to uncover opening 39 to thereby provide for a portion of the heated gas from inlet 16 to pass through the openings in baffle 26 and to outlet 18. In causing a portion of the gas to pass in less than its entire path of flow, the "short-circuited" gas mixes with the gas that travels in the entire path of flow to raise the total temperature of the gas adjacent air inlet chamber 34 above the dew point temperature thereby obviating corrosion of the tubes.

Figure 2:
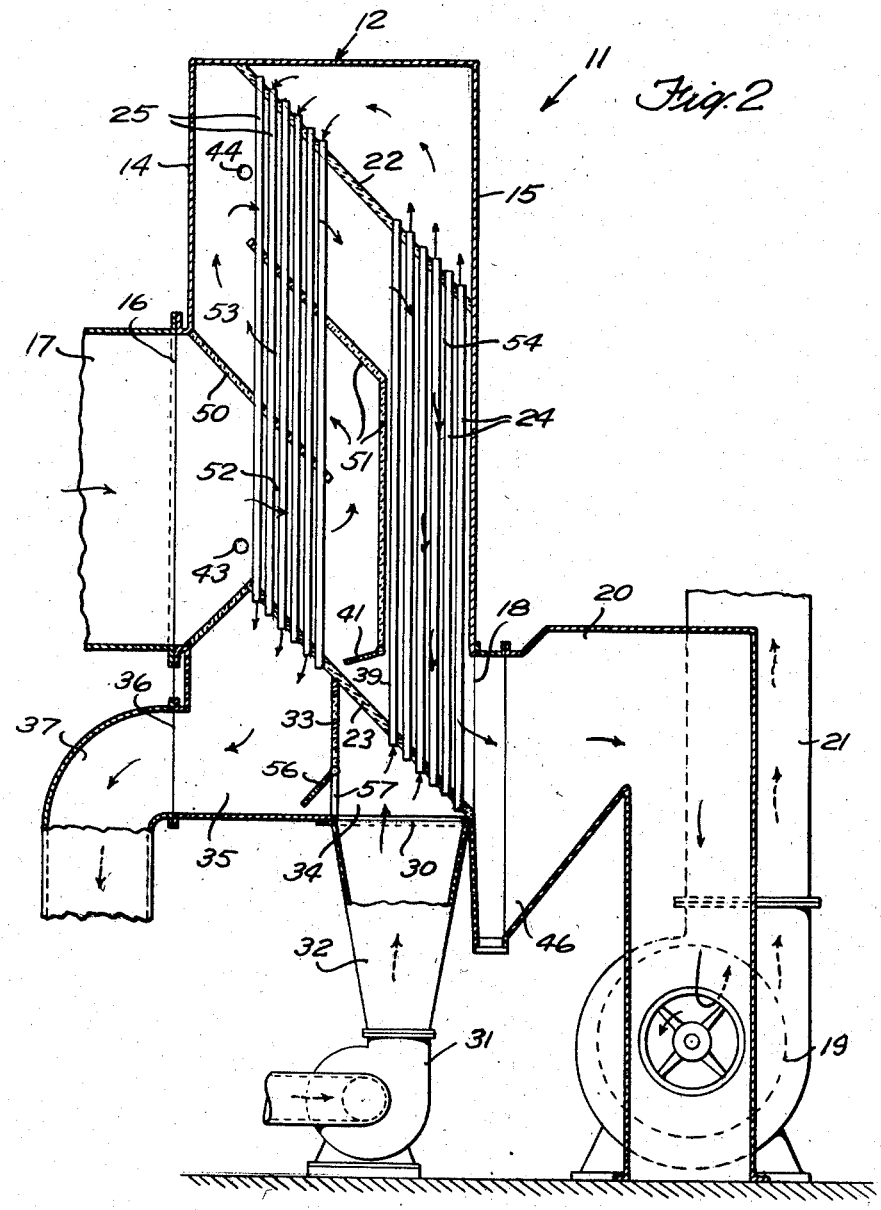
Fig. 2 is a vertical sectional view of a second embodiment of the present invention, and wherein fluid to be heated is bypassed to control the exit fluid temperature and the temperature of the heating gas at an outlet.

A second embodiment of the present invention is illustrated in Fig. 2 and discloses a heat exchanger similar to the heat exchanger of Fig. 1. In the second embodiment, the number of gas passes is increased by providing, an inclined baffle 50 with an edge secured to side wall 14 adjacent gas inlet 16, and a baffle 51 extending vertically for a distance and thence inclined between upper tube sheet 22 and baffle 50. The arrangement of the baffles 50 and 51 thus provides a first gas pass 52, an intermediate pass 53, and a final pass 54. Damper 41 is pivotally mounted on baffle 51 and as in the first embodiment, provides for the "short-circuiting" of a portion of the heating gas. The second embodiment differs in one major respect from the first embodiment in that a bypass door, or damper 56, is pivotally mounted on partition 33 and is arranged to cover and uncover an opening 57 provided in partition 33. When damper 56 uncovers opening 57, a portion of the air is "short-circuited" therethrough and mixes with the heated air in outlet chamber 35 thereby causing the short-circuited portion of air to flow in less than its entire path of flow.

In operation, damper 56 is displaced to regulate the amount of short-circuited air passing from inlet chamber 34 to outlet chamber 35 so as to control both the temperature of air passing through the air outlet opening 36 and the temperature of the heating gas flowing through gas outlet 18. It may be readily understood that the variation in mass flow rate of air through the tubes of tube bank 25 regulates the temperature of the heating gas at the outlet so that large portions of short-circuited air cause an increase in the temperature of the gas.

A third embodiment of the present invention is illustrated in Fig. 3 and discloses an arrangement which is similar to the embodiment of Fig. 2 in that it embodies a multiple pass heating gas path. The third embodiment provides a pair of lower tube sheets 60 and 61 which mount the adjacent lower end of tube banks 24 and 25, respectively. The lower tube sheets are arranged in the heat exchanger to provide a space for a second collector hopper 62 below the floor of casing 12. In the present embodiment, foreign matter falling on inclined baffle 50 and tube sheet 60 discharges into hopper 62, while the foreign matter on the inclined portion of baffle 51 and on tube sheet 61 discharges into collection header 46.

A fourth embodiment of the present invention is illustrated in Fig. 4 and differs from the preceding embodiments in that no means are provided for short-circuiting the heating gas. In the present embodiment, the heating gas has a single gas pass and flows directly from gas inlet 16 to gas outlet 18. Upper fluid chamber 27 is divided into two fluid-tight chambers 70 and 71 by a partition 72 extending from tube sheet 22 to the top of casing 12. A single tube bank 73 is supported and mounted at opposite ends by the tube sheets 22 and 23. Inlet chamber 34 is divided into a first inlet chamber 74 and an intermediate air chamber 75 by an inclined partition 76 which extends from the floor of casing 12 to tube sheet 23. A bypass damper 77 is pivotally mounted on partition 76 and is adapted to uncover an opening 78 formed in the partition to short-circuit a portion of the air in inlet chamber 74 to intermediate chamber 75. A second bypass damper 79 is arranged on partition 33, separating outlet chamber 35 and intermediate chamber 75, and serves to short-circuit a portion of air from the intermediate chamber to the outlet chamber by way of an opening 80 formed in partition 33. Tube bank 73 provides for a four pass path of flow for the air and consists of a first path 81 in communication with first inlet chamber 74 and upper fluid chamber 70, a second pass 82 in communication with fluid chamber 70 and intermediate chamber 75, a third pass 83 in communication with intermediate chamber 75 and upper fluid chamber 71, and a fourth pass 84 in communication with chamber 71 and outlet 35.

In operation, air is drawn into first inlet chamber 74 by forced draft fan 31, thence upwardly through pass 81, downwardly in pass 82, upwardly in pass 83, and downwardly in pass 84. When the temperature of the heating gas leaving the heat exchanger approaches the dew point temperature, bypass damper 77 is operated in a direction to cause a portion of the air in inlet chamber 74 to flow into intermediate chamber 75 so that said portion of air bypasses pass 81 and pass 82 and mixes with the air flowing into pass 83. When it is desired to control the temperature of the air discharging from outlet chamber 35, second bypass damper 79 is operated to cause a portion of the relatively cooler air in intermediate chamber 75 to flow in admixture with the relatively warmer air in outlet chamber 35.

It will now be apparent that the present invention provides an improved heat exchanger wherein novel means control the temperature of discharged heating fluid and fluid to be heated, and further novel means are provided whereby the heat exchanger is effectively cleaned of foreign matter deposited by the passage of heating fluid through the heat exchanger.

Although several embodiments of the present invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A heat exchanger for exchanging heat between heating fluid and fluid to be heated, comprising a chamber having a wall with an inlet for receiving heating fluid and having a second wall with an outlet for discharging the heating fluid from said chamber, a plurality of tubular members disposed in said chamber and arranged in heat exchange relationship with said heating fluid, means for introducing fluid to be heated to said tubular members to provide passage of said fluid in indirect heat exchange relationship with said heating fluid, tube sheets supporting the ends of said tubular members and defining portions of the path of flow for said heating fluid in said chamber, said tube sheets being inclined toward the outlet of said second wall of the chamber to provide for gravity discharge of foreign matter carried by said heating fluid and deposited on said tube sheets, and a collector hopper arranged adjacent the outlet in said second wall for receiving the foreign matter.

2. A vertical heat exchanger for exchanging heat between heating gas and fluid to be heated, comprising a chamber having a wall with an inlet for receiving heating gas and having a second wall with an outlet for discharging the gas from said chamber, a plurality of vertically extending tubular members disposed in said chamber and in fluid-tight and heat exchange relationship with said heating gas, means for introducing a fluid to be heated to said tubular members to cause said fluid to pass through said members in heat exchange relationship with said heating gas, tube sheets mounting the ends of said tubular members and cooperating with said first and said second mentioned walls of said chamber to define a path of flow for said heating gas, said tube sheets extending transversely of said chamber and inclined toward the outlet in said second wall to provide for gravity discharge of foreign matter carried by said heating gas and deposited on said tube sheets and said tubular members, and a collector hopper arranged adjacent the outlet in said second chamber wall for receiving the foreign matter from said chamber.

3. The vertical heat exchanger of claim 2 wherein a soot blower is arranged adjacent said tube sheets to aid in discharging said foreign matter from said chamber into said collector hopper.

4. A vertical heat exchanger for exchanging heat between heating gas and fluid to be heated, comprising a chamber having a pair of parallel walls, one of said walls having an inlet for receiving heating gas and the other of said walls having an outlet for discharging the heating gas from said chamber, a pair of vertically extending groups of tubular members disposed in said chamber and having ends spaced from the walls of said chamber, said tubular members being in heat exchange relationship with said heating gas, tube sheets supporting the ends of said tubular members and cooperating with the walls of said chamber for defining a path of flow for the heating gas through said chamber and further defining a pair of fluid chambers, one at each of the opposite ends of said tubular members, said tube sheets extending transversely of said chamber and inclined toward the outlet in said other wall to provide for gravity discharge of foreign matter carried by said heating gas and deposited on said tubular members and on said tube sheets, means arranged in one of said pair of fluid chambers for separating said one fluid chamber into an inlet chamber and an outlet chamber in fluid-tight relationship with each other, said inlet and outlet chambers communicating with adjacent ends of said tubes respectively, the other of said pair of fluid chambers communicating with the opposite ends of said tubular members, and means for introducing a fluid to be heated to said inlet chamber to provide passage of said fluid through both said tube banks and in indirect heat exchange relationship with the heating gas.

5. A heat exchanger for exchanging heat between heating fluid and fluid to be heated, comprising a chamber having an inlet for receiving the heating fluid and an outlet for passage of said fluid from said chamber, first means in said chamber communicating with said inlet and said outlet and providing a path of flow for said heating fluid, second means in said chamber disposed in heat exchange relationship with said heating fluid and providing a path of flow with an inlet end and an outlet end for a fluid to be heated in indirect heat exchange relationship with said heating fluid, means for introducing fluid to be heated to the inlet end of said second mentioned path of flow, and means for causing a portion of the heating fluid to pass in less than its entire path of flow to thereby control the temperature of the heating fluid at the outlet end of said first mentioned path of flow.

6. A heat exchanger for exchanging heat between heating fluid and fluid to be heated, comprising a chamber having an inlet for receiving the heating fluid and an outlet for passage of said fluid from said chamber, first means in said chamber communicating with said inlet and said outlet and providing a path of flow for said heating fluid, second means in said chamber disposed in heat exchange relationship with said heating fluid and providing a path of flow with an inlet end and an outlet end for a fluid to be heated in indirect heat exchange relationship with said heating fluid, means for introducing fluid to be heated to the inlet end of said second mentioned path of flow, and means for bypassing a portion of said fluid to be heated out of heat exchange relationship with said heating fluid to thereby control the temperature of the heating fluid at the outlet end of said first mentioned path of flow.

7. A heat exchanger for exchanging heat between heating fluid and fluid to be heated, comprising a chamber having an inlet for receiving the heating fluid and an outlet for passage of said fluid from said chamber, first means in said chamber communicating with said inlet and said outlet and providing a path of flow for said heating fluid, second means in said chamber disposed in heat exchange relationship with said heating fluid and providing a path of flow with an inlet and an outlet end for a fluid to be heated in indirect heat exchange relationship with said heating fluid, means for introducing fluid to be heated to the inlet end of said second mentioned path of flow, and means for causing a portion of said heating fluid to pass directly from the inlet of said first mentioned path to the outlet thereof without traversing its entire path of flow to thereby control the temperature of the heating fluid at the outlet end of said first mentioned path of flow.

8. A heat exchanger for exchanging heat between heating fluid and fluid to be heated, comprising a chamber having a wall with an inlet for receiving heating fluid and a second wall having an outlet for discharging said fluid from said chamber, partition means disposed in said chamber providing for a plurality of serially connected passes communicating with said inlet and with said outlet and defining a path of flow for said heating fluid, heat transfer means arranged in said serially connected passes and disposed in heat exchange relationship with said heating fluid, said heat transfer means having an inlet and an outlet and providing a path in which fluid to be heated flows in indirect heat exchange relationship with said heating fluid, means for introducing fluid to be heated to said second mentioned inlet to provide flow of said fluid in the path thereof and through said second mentioned outlet, and bypass control means arranged in said partition means for bypassing a portion of said heating fluid to cause the latter to pass through the partition means and in less than its entire path of flow.

9. A heat exchanger for exchanging heat between a heating fluid and a fluid to be heated, said heat exchanger having an inlet and an outlet for a heating fluid and constructed and arranged to provide a path of flow therethrough for said fluid, means for introducing heating fluid to said inlet to provide passage of said fluid in said path of flow and through said outlet, heat transfer means disposed in heat exchange relationship with heating fluid flowing in said path of flow, said heat transfer means having an inlet and an outlet and providing a path in which fluid to be heated flows in indirect heat exchange relationship with heating fluid, means for introducing fluid to be heated to said second mentioned inlet to provide flow of said fluid in the path thereof and through said second mentioned outlet, a partition disposed in the path of flow of said heating fluid for causing the latter to traverse a plurality of passes in flowing from said first mentioned inlet to said first mentioned outlet, said partition having an opening arranged between said first mentioned inlet and said first mentioned outlet for short-circuiting a portion of the heating fluid directly from the inlet to the outlet, and a movable door arranged in said opening for regulating the quantity of short-circuited heating fluid to thereby control the temperature of the heating fluid discharged through said first mentioned outlet.

10. A vertical heat exchanger for exchanging heat between heating fluid and fluid to be heated, comprising a chamber having a wall with an inlet for receiving heating fluid and having a second wall parallel with the first mentioned wall with an outlet arranged lower than the inlet for discharging heating fluid from said chamber, a pair of vertically arranged and spaced banks of tubes disposed in heat exchange relationship with said heating fluid, means for introducing fluid to be heated to said tubes to provide passage of said fluid therethrough and in heat exchange relationship with said heating fluid, upper and lower tube sheets mounting opposite ends of the tubes with the lower tube sheet engaging the portions of the parallel chamber walls adjacent said inlet and said outlet, said tube sheets being inclined to provide gravity discharge of foreign matter carried by said heating fluid and deposited on said tubes and said tube sheets, a vertical partition arranged between the tube banks and having its lower end adjacent the lower tube sheet to cause the heating fluid to pass upwardly from the inlet and thence downwardly toward the outlet, the portion of the partition adjacent the lower tube sheet having a cut-out section providing for passage of a portion of the heating fluid and foreign matter from the upper pass to pass directly to the chamber wall outlet, and a movable door arranged in said cut-out section for controlling the amount of heating fluid and foreign matter passing therethrough.

11. A heat exchanger for exchanging heat between heating fluid and fluid to be heated, said heat exchanger having an inlet and an outlet for the heating fluid and constructed and arranged to provide a path of flow therethrough for said fluid, means for introducing heating fluid to said inlet to provide passage of said fluid in said path of flow and through said outlet, heat transfer means disposed in heat exchange relationship with said heating fluid flowing in said path of flow, said heat transfer means having an inlet and an outlet and providing a path in which fluid to be heated flows in indirect heat exchange relationship with said heating fluid, means for introducing the fluid to be heated to said second mentioned inlet to provide flow of said fluid in the path thereof and through said second mentioned outlet, means for causing a portion of said heating fluid to pass in less than its entire path of flow, and means for bypassing a portion of the fluid to be heated from said heat transfer means to provide admixture of said portion of fluid to be heated with the fluid to be heated which passed through its entire path of flow.

12. A vertical heat exchanger for exchanging heat between heating gas and fluid to be heated, comprising a chamber having a wall with an inlet for receiving the heating gas and having a second wall with an outlet for discharging the gas from said chamber, a pair of vertically extending banks of tubes disposed in said chamber and in heat exchange relationship with said heating gas, means for introducing a fluid to be heated to said tubes to cause said fluid to pass through said tubes in heat exchange relationship with said heating gas, upper and lower tube sheets mounting opposite ends of said tube banks and maintaining the gas and fluid out of contact with each other in portions of their paths of flow, the lower tube sheet cooperating with the walls of said chamber to provide a fluid chamber in communication with said banks of tubes, a wall arranged in said fluid chamber for dividing the latter into an inlet fluid chamber and an outlet fluid chamber, a conduit communicating a source of fluid to be heated with said inlet fluid chamber to provide flow of fluid to be heated through said tubes, a second conduit communicating with said outlet fluid chamber for carrying away said fluid to be heated after the latter passes through said tubes, said last mentioned wall having an aperture therein providing for passage of a portion of fluid to be heated from said inlet fluid chamber to said outlet fluid chamber without passing in heat exchange relationship with said heating gas, a movable door arranged in said aperture for controlling the amount of fluid to be heated passing therethrough, and means in said first mentioned chamber for causing a portion of the heated gas to pass in less than its entire path of flow.

13. A heat exchanger for exchanging heat between heating fluid and fluid to be heated, comprising a chamber having a wall with an inlet opening for receiving the heating fluid and having a wall with an outlet opening for discharging said heating fluid from said chamber, partition means arranged in said chamber and providing a multi-pass flow path for said heating fluid, a first pass of said flow path communicating with said inlet opening and a last pass of said flow path communicating with said outlet opening, heat transfer means disposed in heat exchange relationship with the heating fluid flowing in said path of flow, said heat transfer means having an inlet and an outlet and providing a path in which fluid to be heated flows in indirect heat exchange relationship with said heating fluid, means for introducing fluid to be heated to said second mentioned inlet to provide flow of said fluid in the path thereof and through said second mentioned outlet, and means arranged in said partition means for causing a portion of the heating fluid to flow directly from said first pass to said last pass of the heating fluid flow path without flowing in any intermediate pass.

14. A vertical heat exchanger for exchanging heat between heating fluid and fluid to be heated, comprising a chamber having a wall with an inlet opening for receiving heating fluid and having a second wall with an outlet for discharging said heating fluid from said chamber, a collecting hopper arranged adjacent said outlet opening, partition means arranged in said chamber and providing a multi-pass flow path for said heating fluid, a pair of vertically extending banks of tubes spaced from each other and disposed in said chamber in heat exchange relationship with said heating fluid, means for introducing fluid to be heated to said tubes, a second collecting hopper arranged in the space between said tube banks, an upper tube sheet supporting adjacent ends of said tube banks, and a pair of lower tube sheets supporting the opposite and adjacent ends of said tube banks and being inclined to the horizontal, one of said lower tube sheets having an end adjacent the inlet opening of said chamber and having another end adjacent said second mentioned collecting hopper to provide for gravity discharge into said last mentioned collecting hopper of foreign matter carried by the heating fluid and deposited on said one lower tube plate, while the other of said lower tube plates is arranged in the last pass of said multi-pass flow path and adjacent said outlet opening to provide gravity discharge of foreign matter on said other lower tube sheet into said first mentioned soot collecting hopper.

15. A vertical heat exchanger for exchanging heat between heating fluid and fluid to be heated, comprising a chamber having a wall with an inlet opening and having a second wall with an outlet opening for discharging heating fluid from said chamber, a plurality of tubular members spaced from the walls of said chamber and arranged in heat exchange relationship with said heating fluid, upper and lower tube plates mounting opposite ends of said tubular members respectively, said plates cooperating with the walls of said chamber to define an upper fluid chamber and a lower fluid chamber in fluid-tight relationship with the part of the chamber through which the heating fluid passes, means arranged in the lower fluid chamber providing an inlet chamber, an intermediate chamber and an outlet chamber, means arranged in said upper fluid chamber providing a pair of chambers, each of said pair of chambers being in communication with the inlet and intermediate chambers by way of a portion of said tubular members and the other of said pair of chambers being in communication with said intermediate and said outlet chambers by way of the remaining tubular members, a conduit communicating a source of fluid to be heated with said inlet chamber to provide passage of said fluid through said tubular members, whereby the fluid passes into said one upper chamber thence through said intermediate chamber and from the latter to said other upper chamber and finally to said outlet chamber, means for causing a portion of the fluid to be heated in said inlet chamber to flow into said intermediate chamber without passing through the tubular members into said one upper chamber, and means for causing a portion of the fluid to be heated in said intermediate chamber to flow into said outlet chamber without passing through the tubular members into said other chamber.

16. The vertical heat exchanger of claim 15 wherein the means arranged in the lower chamber comprises partitions and the last two mentioned means comprise controlled apertures providing for regulated portions of fluid to be heated to flow into the intermediate and outlet chambers without passing through the tubular members in heat exchange relationship with the heating fluid.

References Cited in the file of this patent

UNITED STATES PATENTS

| | | |
|---|---|---|
| 184,323 | Berryman | Nov. 14, 1876 |
| 362,395 | Otis | May 3, 1887 |
| 2,007,623 | Toensfeldt | July 9, 1935 |
| 2,511,647 | Marshall | June 13, 1950 |
| 2,578,783 | Cruise | Dec. 18, 1951 |
| 2,582,830 | Hawley | Jan. 15, 1952 |